(12) United States Patent
Cheng et al.

(10) Patent No.: US 11,427,775 B2
(45) Date of Patent: Aug. 30, 2022

(54) INTEGRATED PREPARATION AND DETECTION DEVICE FOR BIOMASS-BURNING AEROSOL AND METHOD THEREBY

(71) Applicant: Tianjin University, Tianjin (CN)

(72) Inventors: Zhanjun Cheng, Tianjin (CN); Congcong Cao, Tianjin (CN); Guanyi Chen, Tianjin (CN); Jinglan Wang, Tianjin (CN); Jing Tian, Tianjin (CN); Beibei Yan, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 17/074,808

(22) Filed: Oct. 20, 2020

(65) Prior Publication Data

US 2021/0115346 A1 Apr. 22, 2021

(30) Foreign Application Priority Data

Oct. 21, 2019 (CN) .......................... 201910998001.2

(51) Int. Cl.
  *C10J 3/72* (2006.01)
  *C10J 3/14* (2006.01)
  *C10J 3/20* (2006.01)
  *H01J 49/04* (2006.01)
  *H01J 49/40* (2006.01)

(52) U.S. Cl.
  CPC ................. *C10J 3/723* (2013.01); *C10J 3/14* (2013.01); *C10J 3/20* (2013.01); *H01J 49/0445* (2013.01); *H01J 49/0463* (2013.01); *H01J 49/0472* (2013.01); *C10J 2200/09* (2013.01); *C10J 2200/15* (2013.01); *C10J 2300/0916* (2013.01); *C10J 2300/0983* (2013.01); *H01J 49/40* (2013.01)

(58) Field of Classification Search
  CPC .. C10J 2300/0916; C10B 53/02; Y02P 30/20; Y02P 20/145; C10G 2300/1014
  See application file for complete search history.

(56) References Cited

U.S. PATENT DOCUMENTS 4,448,589 A * 5/1984 Fan ............................ C10J 3/54
  48/209
4,842,825 A * 6/1989 Martin ................... G01N 31/12
  422/89

(Continued)

Primary Examiner — Imran Akram
(74) Attorney, Agent, or Firm — Element IP, PLC

(57) ABSTRACT

Disclosed herein are integrated preparation and detection devices for studying biomass-burning aerosols, where the devices include a micro-fluidized bed reactor (MFBR), a transmission line, and an on-line detection unit that are connected in sequence. The MFBR may include a pyrolysis reactor and a pyrolysis furnace; the pyrolysis reactor may include a thermocouple, an introduction tube, and quartz sands; the on-line detection unit may be an on-line photoionization mass spectrometer; and the photoionization mass spectrometer may include a laser desorption system, a laser ionizer and a light energy ionizer. Devices of the present disclosure are beneficial to retain the original state of aerosol particles, and the fixed MFBR can realize rapid pyrolysis of a biomass due to its high and stable heat conduction efficiency, which is beneficial to studying the formation mechanism of aerosol particles.

4 Claims, 5 Drawing Sheets

(56) References Cited

U.S. PATENT DOCUMENTS

| | | | | |
|---|---|---|---|---|
| 8,317,883 B1* | 11/2012 | Boateng | .................... | C10C 5/00 44/307 |
| 2008/0230692 A1* | 9/2008 | Reilly | .................. | H01J 49/164 250/288 |
| 2011/0182796 A1* | 7/2011 | Lang | ..................... | C01B 33/025 423/350 |
| 2011/0201855 A1* | 8/2011 | Marinangeli | ............ | C10G 3/47 585/240 |
| 2011/0232166 A1* | 9/2011 | Kocal | ...................... | C10G 3/46 44/313 |
| 2014/0130402 A1* | 5/2014 | Kastner | ................. | C10G 1/002 44/386 |
| 2018/0318749 A1* | 11/2018 | Dowaki | ................... | C10K 3/04 |
| 2020/0283293 A1* | 9/2020 | McFarland | ............. | B01J 8/067 |
| 2021/0220801 A1* | 7/2021 | Mennell | ................ | B01J 20/3078 |
| 2021/0317130 A1* | 10/2021 | Duncan | ................... | B01J 6/008 |

* cited by examiner

INTEGRATED PREPARATION AND DETECTION DEVICE FOR BIOMASS-BURNING AEROSOL AND METHOD THEREBY

TECHNICAL FIELD

The disclosure relates to the research field of preparation and on-line detection of aerosol products generated in a biomass combustion process, and in particular, to an integrated preparation and detection device for a biomass-burning aerosol and a method thereby.

BACKGROUND

Forest fire, which ranks first among the three natural disasters that destroy forests, brings a heavy loss to forestry production every year and affects the protection and development of forest resources. Forest fires, once breaking out, will cause heavy casualties, property losses and environmental pollution due to the characteristics of strong burstiness, high destructiveness, difficult putting-out and the like. Aerosols such as black charcoal produced during forest fires will exhibit a strong absorption to solar radiation and cause a serious decline in air quality, which thus poses a severe impact on weather. With the development of human science and technology, in order to further understand the combustion mechanisms of forest fires, precursors have done a lot of research. Due to the complex physical and chemical combustion characteristics of forest fires, a large number of assumptions (such as infinite chemical reaction rate hypothesis, solid thermal thinness hypothesis, and infinite width hypothesis) are adopted in most of experimental and theoretical studies, and analysis is mainly conducted from the macro levels (air entrainment and thermal feedback). Most of the combustibles (wood and hay) during forest fires are biomasses. Research on the mechanism of biomass combustion is helpful to understand and prevent forest fires.

Aerosol, also known as aerogel or aero-solution, refers to a dispersion system in which solid or liquid particles are uniformly suspended in a gas medium. If particles in a dispersion system, which are larger than gaseous molecules and smaller than coarse particles, do not obey the law of gas molecular motion like gaseous molecules and also will not sink under the action of gravity like coarse particles, thus exhibiting colloidal properties, the dispersion system is called an aerosol.

Biomass is a solid combustible, which will undergo pyrolysis and release harmful substances such as combustible gas and aerosol after being heated to a certain temperature. When a combustible gas encounters an open flame or the temperature, concentration and the like of the combustible gas meet the critical conditions of spontaneous combustion, the pyrolysis gas and solid combustibles are ignited. Smoke associated with forest fires includes a large number of smoke aerosol particles. An aerosol is a colloidal dispersion system where small solid or liquid particles are dispersed and suspended in a gas medium, which is also known as a gas dispersion system. According to reports, atmospheric haze related to aerosols that are caused by forest fires in Southeast Asia can lead to loss of life for 500,000 people in Southeast Asia every year. At present, the international community is still exploring the emissions from biomass combustion. Gaseous, particulate or other substances emitted during a biomass combustion process, as a pollution source, will significantly impact the ecological environmental pollution. Except for the direct emission of gaseous and particulate substances, secondary pollutants will also be produced to form secondary aerosols.

Previous studies on biomass combustion mainly focused on flame appearance, thermal radiation or the like, but rarely involved biomass pyrolysis and ignition mechanisms, and aerosol-generating mechanisms. In recent years, the study on aerosols and climate and environmental effects thereof has become one of the research focuses in atmospheric chemistry and combustion chemistry internationally. As one of the main sources of organic aerosols, biomass combustion plays an important role in the generation of aerosols. Therefore, there is an urgent need to study the mechanism of aerosol generation.

The intermediates of products from biomass pyrolysis and combustion can be detected to understand the combustion mechanism of biomass and the harmful components of aerosol products, and to realize a more comprehensive understanding of biomass combustion during a fire disaster from the micro level to the macro level, thereby effectively reducing the probability of forest fires.

SUMMARY

In view of this, the disclosure is intended to overcome the shortcomings in the prior art and provide an integrated preparation and detection device for a biomass-burning aerosol and a method thereby.

In order to solve some of the problems in the prior art, as a technical solution, the disclosure provides an integrated preparation and detection device for a biomass-burning aerosol, including a micro-fluidized bed reactor (MFBR), a transmission line, and an on-line detection unit that are connected in sequence.

The MFBR includes a pyrolysis reactor and a pyrolysis furnace; the pyrolysis reactor includes a thermocouple, an introduction tube, and quartz sands; the on-line detection unit is an on-line photoionization mass spectrometer; and the photoionization mass spectrometer includes a laser desorption system, a laser ionizer and a light energy ionizer.

The MFBR adopts a fixed design, and is filled with a specified number of quartz sands.

The thermocouple is sealed by a fluorine rubber gasket when passing through a direct connection; and the quartz sands are located at a position 3 cm above the bottom of the reactor, with a thickness of 3 mm.

The transmission line is externally provided with a relatively thick insulation layer and internally provided with a copper tube having an outer diameter of 3 mm for protecting capillary tubes, and the capillary tubes adopt a stainless steel ferrule and a graphite gasket for differential vacuum seal.

The photoionization mass spectrometer adopts two laser sources to desorb and ionize an aerosol.

As a second technical solution, the disclosure provides an aerosol preparation method using the integrated preparation and detection device for a biomass-burning aerosol, where, before experiment, a biomass sample is placed in the upper half of the pyrolysis reactor, and then the reactor is sealed and introduced with nitrogen to remove oxygen; and the biomass is introduced into the quartz sands and then undergoes pyrolysis due to a uniform temperature range of quartz sands to give an aerosol product.

As a third technical solution, the disclosure provides a method for detecting a macromolecular aerosol using the integrated preparation and detection device for a biomass-burning aerosol, including: subjecting the aerosol first to desorption with 1,064 nm laser and then to ionization with 10.6 eV vacuum ultraviolet light; and subjecting generated ions to time-of-flight mass spectrometry (TOFMS).

An aerosol product is subjected to size segregation, then absorbed in the mass spectrometry transmission line at 280° C., and transferred into the photoionization mass spectrometer via the transmission line for on-line detection. Different types of aerosols are subjected to ionization and desorption with two kinds of laser according to characteristics of the aerosols.

Detection results will be directly reflected on acquisition software.

Beneficial effects:

The design of the fixed MFBR is suitable for fundamental experimental research. Due to the small internal volume of a pyrolysis reactor, the high flow rate of a carrier gas, and the short retention time of a pyrolysis gas, secondary reactions of pyrolysis aerosols can be avoided as much as possible, which is beneficial to retain the original state of aerosol particles.

The fixed MFBR can realize rapid pyrolysis of a biomass due to its high and stable heat conduction efficiency, which is more beneficial to study the formation mechanism of aerosol particles.

Different from a traditional fixed bed reactor, the fluidized bed device can realize the continuous input and output of solid materials, has a simple structure, and enables easier biomass loading and unloading. Moreover, the relative movement of quartz sand particles makes the bed layer have prominent heat transfer performance, so the temperature inside the bed layer is uniform and easy to be controlled. The reactor has higher mass and heat transfer efficiency, which in turn facilitates the full pyrolysis or combustion of a biomass inside the reactor.

After the reaction is completed, in order to conduct on-line research on a pyrolysis gas, an aerosol obtained from the pyrolysis is usually introduced into an on-line detection unit for analyzing its composition and structure. In the experiment, in order to prevent the prepared aerosol from condensing and blocking tubes during the transmission process, this technology uses a new heating rope with an outer diameter of 6 mm for heating. Different from a traditional heating belt, the heating rope is more convenient in winding thin tubes, can more tightly wraps around tubes, and meet the needs of various interfaces. Moreover, in the process of connecting with the mass spectrometer, a sealed capillary design is adopted, which can realize the differential vacuum seal for the system from atmospheric pressure to vacuum.

This technology also optimizes the function design of the photoionization mass spectrometer, which adopts two ionization energies during ionization. One is from the second laser transmitter of 10.6 eV, and the other is from the third laser transmitter of 1,064 nm, and the two transmitters constitute a laser desorption system of the device in the disclosure.

Different from a traditional photoionization mass spectrometer, the device can determine two types of aerosols at the same time. When the gas introduced through the first carrier gas-introducing tube and the second carrier gas-introducing tube is nitrogen, during the pyrolysis of a biomass in the reactor, a large number of oxygen-containing compounds, such as phenol and alkyl compounds, are generated. When the gas introduced is air, a biomass undergoes combustion reaction in the reactor, and secondary pyrolysis products of macromolecular polycyclic aromatic hydrocarbons (PAHs) will be generated.

The advantage of this device is that aerosols can be subjected to ionization and desorption with two ionization energies. When the generated aerosols are oxygen-containing compounds, the second laser transmitter of 10.6 eV light can be used to ionize molecules; and when the generated aerosols are macromolecular particles, the particles can be subjected to desorption with the third laser transmitter of 1,064 nm laser, and then to ionization with 10.6 eV vacuum ultraviolet. Since the device can achieve the on-line detection of two types of aerosol products, the research efficiency of the aerosol-generating mechanism in a biomass combustion process is greatly improved. Moreover, the device is suitable for basic research.

Figure 1:
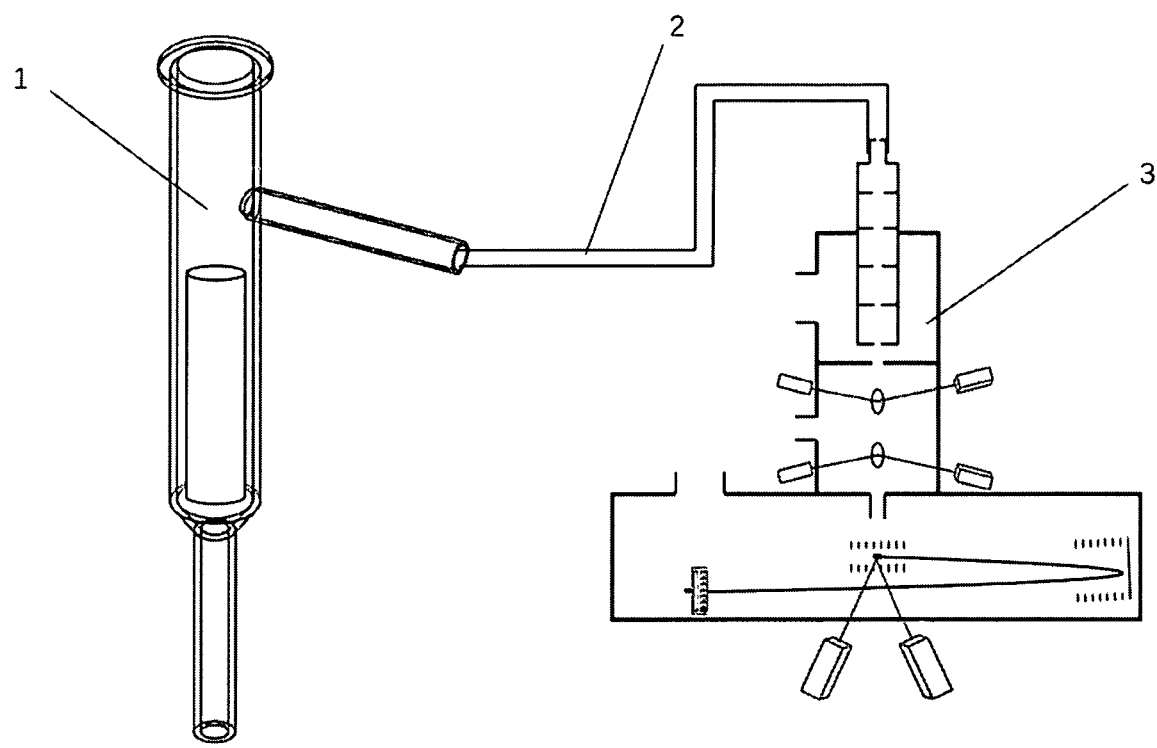
FIG. 1 is a schematic diagram illustrating the connection of an FBR and a photoionization mass spectrometer.

Reference numerals: 1 represents a fixed MFBR, 2 represents a transmission line, 3 represents an on-line detection unit, 101 represents a pyrolysis reactor, 102 represents a first thermocouple, 103 represents an introduction tube, 104 represents a first carrier gas-introducing tube, 105 represents a biomass-introducing device, 106 represents a pyrolysis furnace heating wire, 107 represents quartz sands, 108 represents a second carrier gas-introducing tube, 109 represents a second thermocouple, 301 represents a first vacuum pump, 302 represents a second vacuum pump, 303 represents a third vacuum pump, 304 represents an aerosol inlet, 305 represents a first laser transmitter, 306 represents a second laser transmitter, and 307 represents a third laser transmitter.

DETAILED DESCRIPTION

The disclosure is further described below through examples with reference to the accompanying drawings.

As shown in FIG. 1, a device for preparing and detecting an aerosol product from biomass combustion includes a fixed MFBR 1, a transmission line 2, and an on-line detection unit 3 that are connected in sequence.

Figure 2:
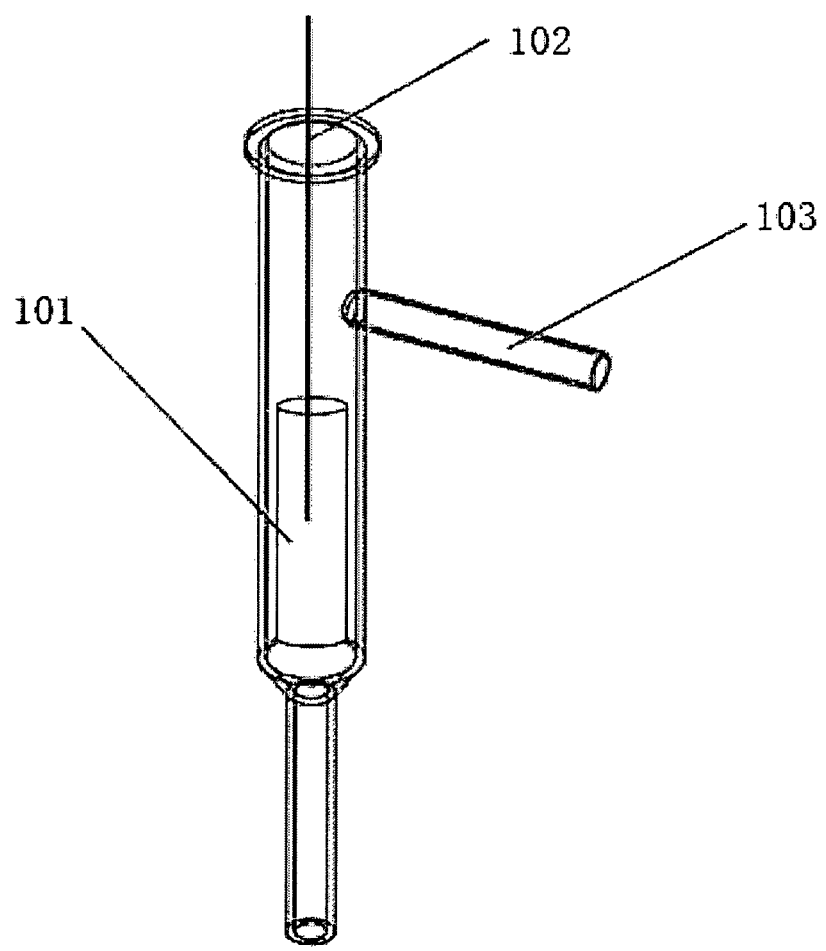
FIG. 2 is a schematic diagram of FBR.
Figure 4:
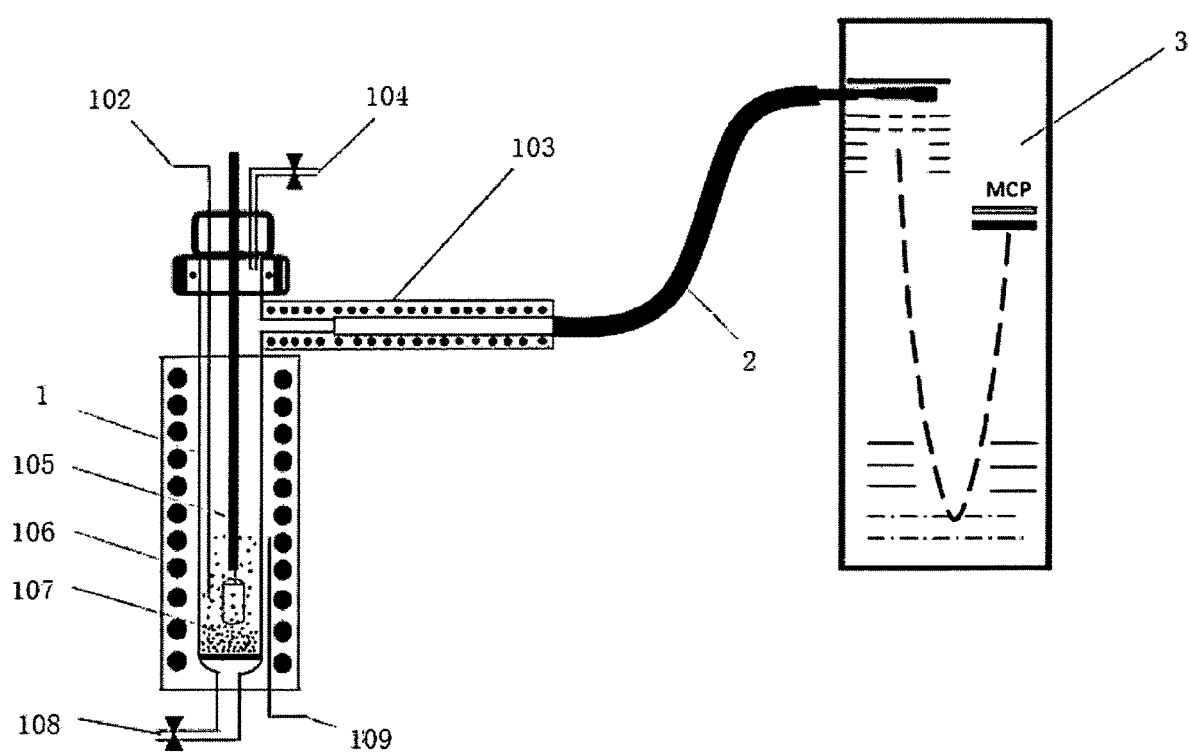
FIG. 4 is a flow diagram of an experimental device.
Figure 5:
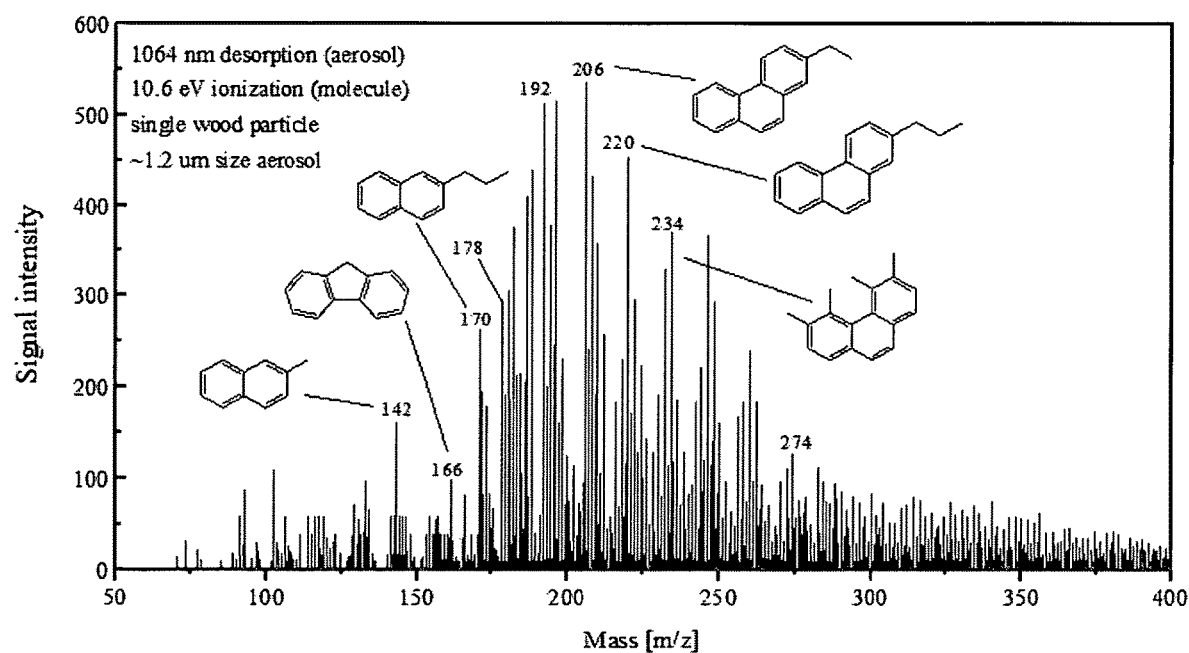
FIG. 5 is a mass spectrum of a product.

As shown in FIG. 2 and FIG. 4, the fixed MFBR 1 adopts a fixed design; and a first thermocouple 102 and a second thermocouple 109 are placed in the FBR to detect the biomass reaction temperature in real time.

The fixed MFBR 1 includes a pyrolysis reactor 101 and a pyrolysis furnace; the pyrolysis reactor 101 includes a first thermocouple 102, an introduction tube 103, and quartz sands 107; the on-line detection unit 3 is an on-line photoionization mass spectrometer; and the photoionization mass spectrometer includes a laser desorption system, a laser ionizer and a light energy ionizer.

The fixed MFBR 1 adopts a fixed design and is made of quartz glass. A specified number of quartz sands 107 are placed in the fixed MFBR 1. Before experiment, a biomass-introducing device 105 is placed in the upper half of the pyrolysis reactor 101, and the reactor is sealed and introduced with nitrogen to remove air; the biomass is introduced into the quartz sands 107 and then undergoes pyrolysis due to a uniform temperature range of the quartz sands 107 to give an aerosol; and the aerosol is then introduced into the on-line photoionization mass spectrometer via the transmission line 2 for detection.

The first thermocouple 102 is sealed by a fluorine rubber gasket when passing through a direct connection; and the quartz sands 107 are located at a position 3 cm above the bottom of the pyrolysis reactor 101, with a thickness of 3 cm.

Housings of the pyrolysis furnace are all made of quartz glass.

The transmission line 2 is externally provided with a relatively thick insulation layer and internally provided with a copper tube having an outer diameter of 3 mm for protecting capillary tubes from being broken. The capillary tubes are sealed with a stainless steel ferrule and a graphite gasket, which are easy to be replaced.

The photoionization mass spectrometer uses two laser sources to desorb and ionize aerosols, where, a macromolecular aerosol is subjected first to desorption with 1,064 nm laser and then to ionization with 10.6 eV vacuum ultraviolet light; and generated ions are subjected to TOFMS.

Figure 3:
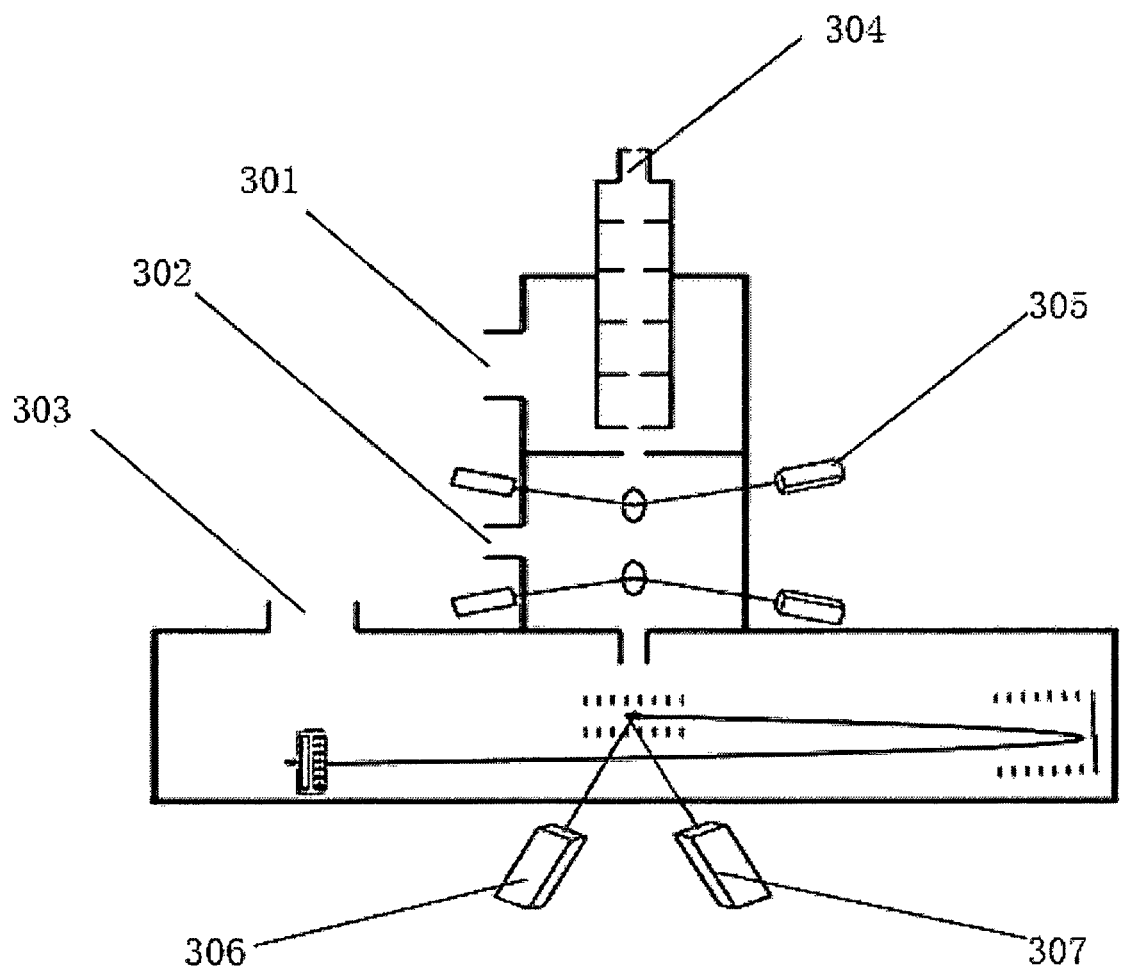
FIG. 3 is a schematic diagram of a photoionization mass spectrometer.

As shown in FIG. 3, a new laser desorption system is added to the photoionization mass spectrometer. In the presence of a second laser transmitter 306 of a laser beam, a third laser transmitter 307 of a 1,064 nm laser beam is added to desorb aerosols in different states. In the photoionization mass spectrometer, 301, 302, and 303 are all vacuum pump extraction ports, and an aerosol inlet 304 is connected to the transmission line 2. An aerosol is transferred to the photoionization mass spectrometer after being subjected to size segregation. The aerosols in two states are subjected to desorption under different types of ionization energies, respectively, which is beneficial to analyze and detect aerosols in different states.

As shown in FIG. 4, the fixed MFBR 1 is connected to the photoionization mass spectrometer 3 via the transmission line 2, and a biomass is placed in the pyrolysis reactor 101. Generally, a biomass is fixed on the biomass-introducing device 105 by wire-winding, and then introduced into the quartz sands 107 for pyrolysis; nitrogen is introduced into the reactor through the first carrier gas-introducing tube 104 and the second carrier gas-introducing tube 108; the biomass begins to undergo combustion or pyrolysis after being heated to a certain temperature; an aerosol generated during the pyrolysis process flows into the transmission line 2 with the flow of carrier gas through the introduction tube 103, where, the transmission line 2 is connected to the aerosol inlet 304 on the mass spectrometer; the aerosol is subjected to size segregation in the photoionization mass spectrometer; and resulting two types of aerosols are subjected to ionization and desorption with two kinds of laser, respectively.

Description of Working Principles

A special case is adopted for illustration. Some elm (a biomass raw material) is taken and processed into cylinders with a diameter of 6 mm and a length of 15 mm for use. A specified number of quartz sands 107 are placed in the pyrolysis reactor 101. A temperature controller is first turned on for preheating (a preheating temperature is determined according to requirements of the pyrolysis). The preheating temperature is set to 500° C. While preheating, nitrogen is introduced into the MFBR at a certain flow rate (which is intended to blow off the remaining air in the reactor). When the temperature is stabilized at 500° C. and relatively uniform, the flow rate of nitrogen is adjusted to the required flow rate of a carrier gas. The prepared elm biomass is wound on the biomass-introducing device 105 with wires, and then introduced into the quartz sands 107 for pyrolysis. An aerosol generated from pyrolysis is introduced into the on-line detection unit 3 via the heated transmission line 2 for on-line detection. In the experiment, the pyrolysis temperature in the pyrolysis reactor 101 can be changed by adjusting the temperature controller, which is beneficial to study aerosols generated during the pyrolysis of a biomass at different temperatures. If an aerosol of a secondary pyrolysis product generated during a biomass combustion process needs to be detected, the introduced nitrogen can be changed into oxygen or air, and then a sample is re-added for detection.

What is claimed is:

1. A method for preparing an aerosol, the method comprising:
    placing a biomass sample in an upper half of a pyrolysis reactor contained in a micro-fluidized bed reactor, wherein the micro-fluidized bed reactor is made of quartz glass, the pyrolysis reactor contains quartz sand, and the quartz sand is located at a position 3 cm above the bottom of the pyrolysis reactor with a thickness of 3 mm;
    sealing the micro-fluidized bed reactor and introducing nitrogen in order to remove oxygen from the micro-fluidized bed reactor; and
    introducing the biomass sample into the quartz sand and subjecting the biomass sample to pyrolysis due to a uniform temperature range of the quartz sand to form the aerosol with a carrier gas introduced into the pyrolysis reactor during the pyrolysis, wherein a flow rate of the carrier gas is controlled so as to avoid a secondary reaction of the aerosol.

2. The method according to claim 1, wherein the micro-fluidized bed reactor adopts a fixed design.

3. The method according to claim 1, wherein the micro-fluidized bed reactor further contains a pyrolysis furnace.

4. The method according to claim 1, wherein the pyrolysis reactor further contains a thermocouple and an introduction tube.

* * * * *